United States Patent [19]

Derain

[11] 4,009,791
[45] Mar. 1, 1977

[54] TRUCK DUMP-BODY OPERATING MECHANISM

[75] Inventor: Christian Derain, Saint Aubin le Vieil Evreux, France

[73] Assignee: Societe Nouvelle des Bennes Saphem, La Neuve-Lyre, France

[22] Filed: Sept. 23, 1975

[21] Appl. No.: 615,890

[30] Foreign Application Priority Data

Oct. 2, 1974 France .............................. 74.33245

[52] U.S. Cl. .............................. 214/501; 214/77 R; 214/515
[51] Int. Cl.² .......................................... B60P 1/64
[58] Field of Search .................. 214/77 R, 501, 505, 214/515

[56] References Cited
UNITED STATES PATENTS 3,825,137  7/1974  Mackrill et al. .................. 214/515
3,874,537  4/1975  Kou .................................. 214/501

*Primary Examiner*—Robert G. Sheridan
*Attorney, Agent, or Firm*—Karl W. Flocks

[57] ABSTRACT

Truck dump-body operating mechanism comprising a L-shaped member the horizontal branch of which is, on one hand, slidably translatable in side members and, on the other hand, pivoting about a shaft transverse to the chassis of the truck, the vertical branch having a hook cooperating with a fastening member on the forward upper part of the dump-body, a single jack controlling both the sliding motion and the pivoting motion of said horizontal branch, whereby said dump-body may be set down on the ground and subsequently reloaded onto the truck, said truck being a light one having a relatively low useful load, while a locking device allows said dump-body to be tipped up.

4 Claims, 13 Drawing Figures

TRUCK DUMP-BODY OPERATING MECHANISM

The present invention relates to a truck dump-body operating mechanism which not only enables the dump-body to be tipped up but also to be set down on the ground from the truck and to be subsequently reloaded back onto the truck from the ground. A mechanism according to this invention is more particularly applicable to light trucks having a relatively low useful load.

The applicant has already described in his U.S. Pat. No. 3,819,075 a truck dump-body loading and unloading mechanism. This mechanism consists basically of an L-shaped member mounted on the chassis, the upper end of the verticle branch of which is provided with an automatic hook cooperating with a fastening member on the forward upper part of the dump-body and the horizontal branch of which is telescopic and supported for pivotal motion about a transverse shaft of said chassis. The dump-body unloading motion takes place in two stages, to wit:

Stage one: backward motion of the dump-body through shortening of said telescopic horizontal branch, in conjunction with releasing of the dump-body from the chassis;

Stage two: pivoting of said L-shaped member about said transverse shaft and releasing of the dump-body once the latter rests on the ground. For reloading of the truck, the above two stages take place in reverse.

In addition, this mechanism enables the dump-body to be tilted about a transverse shaft located at the rear of the chassis by dispensing with "Stage one" above, the dump-body remaining fastened to the horizontal branch of the pivoting member.

Notwithstanding its simple design, however, this mechanism requires a robust and consequently heavy structure. In particular, "Stage one" above, which involves shortening the horizontal branch by telescoping it into a slideway is controlled by a first jack, and "Stage two" is controlled by means of two jacks, the said horizontal branch being in reality a double-branch. Such an arrangement of levers and jacks and their associated hydraulic generator is compatible with large-size trucks and dump-bodies but not with light trucks of small size and small useful load.

The present invention accordingly relates to a simplified mechanism for operating a dump-body on a light truck, involving simple mechanical components yet retaining undiminished efficiency and ease of operation.

A mechanism according to this invention, which includes an L-shaped member the vertical branch of which comprises an automatic hook at its upper end and which is applicable to trucks equipped with a chassis the front part of which is adjacent the cab and the rear part is the end remote therefrom, is basically characterized by the fact that it includes, in combination:

two parallel side members having one of their ends pivotally mounted about a first tipping shaft transverse to the chassis and located at the rear end thereof;

a horizontal branch of the L-shaped member, of fixed length, comprising a slipper slidably translatable in said side members and further comprising, at its outer end, a hinge point about a second shaft transverse to the chassis, the distance between said slipper and said hinge point being invariable;

upon said side members, a stop for limiting the sliding travel of said horizontal branch, and an opening of size at least equal to that of said slipper in the upper part of said side members that registers with said slipper when the horizontal branch abuts against said stop means in the tipping position; and a single jack for controlling sliding motion and pivoting of said horizontal branch about the second shaft, reacting against a fixed point at the forward end of the chassis and connected to the horizontal branch.

In accordance with further particularities:

the second transverse shaft is immediately adjacent the stop means and is a translatable transverse shaft rigidly connected to the outer end of the horizontal branch, or is a fixed transverse shaft to which is articulated a translatable pivot fast with the outer end of the horizontal branch; and the jack piston is hingedly connected to a parallel-motion linkage interconnecting the horizontal branch and the side members.

The upper parts of the side members are provided with projecting catches adapted to cooperate with stubs fixed to the underneath of the dump-body to impart lateral stability to same. The rear shaft comprises rolls intended to facilitate the movement of the dump-body with respect to the chassis.

Further particularities and advantages will emerge from the description which follows with reference to the accompanying non-limitative exemplary drawings, in which:

FIGS. 1 to 4 diagrammatically illustrate the simplified mechanism according to this invention and its manner of operation;

FIG. 5 illustrates operation of the mechanism according to FIGS. 1 to 4 in the dump-truck mode;

FIGS. 6 to 9 diagrammatically illustrate the subject mechanism of the invention equipped with a linkage arrangement;

In the drawings, like parts are designated by like reference numerals.

Figure 1:
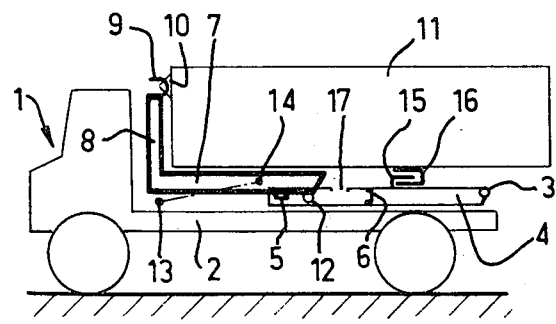
Figure 2:
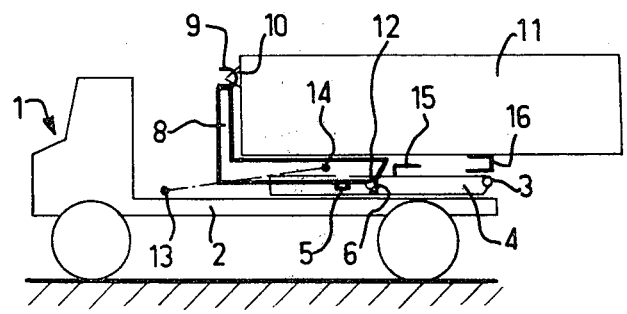

Referring first to FIGS. 1 to 4, the truck 1 shown thereon includes a chassis 2 carrying at its rear a transverse dump shaft 3 to which are hingedly connected two parallel side members 4 of cross-section adapted to receiving therein a slipper 5 and stop means 6. Slipper 5 is fast with the fixed-length horizontal branch 7 of an L-shaped member the vertical branch 8 of which bears on its upper end an automatic hook 9 cooperating with a fastening member 10 provided on the upper front portion of a dump-body, flat supporting surface, or container 11. Slipper 5 is slidably and translatably engaged into side members 4, thereby enabling the horizontal branch supporting the dump-body 11 to translate between a forward position (FIG. 1) and a rear position (FIG. 2).

The outer end of horizontal branch 7 bears a hinge point 12, possible design details of which will be explained hereinafter and which provides the hinge line for branch 7 when the same reaches stop means 6. A translation and pivotal motion control jack (shown in dash-lines) is connected across a fixed point 13 at the front of the chassis and a hinge point 14 on horizontal branch 7. A projecting catch 15 on the upper part of side member 4 cooperates with a stub 16 on the underneath of dump-body 11 when same is in the forward position and releases therefrom when same is in the rear position. Such locking of the dump-body in its forward position, which is the road-going configuration for the truck, is intended primarily for ensuring lateral stability of the dump-body, latching proper of the latter on the chassis being provided directly by the existence of slipper 5 within side member 4, which side member is itself restrained on the chassis by any convenient means.

Figure 3:
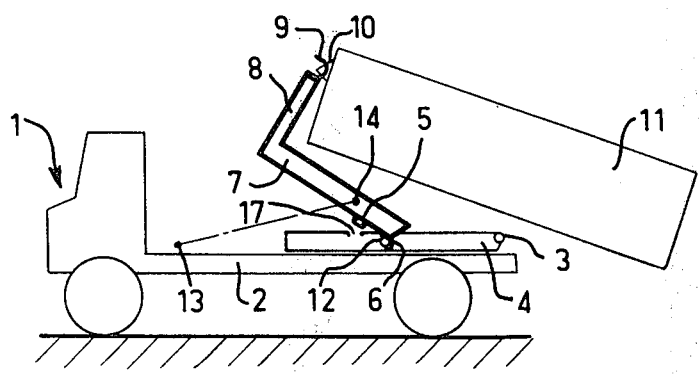
Figure 4:
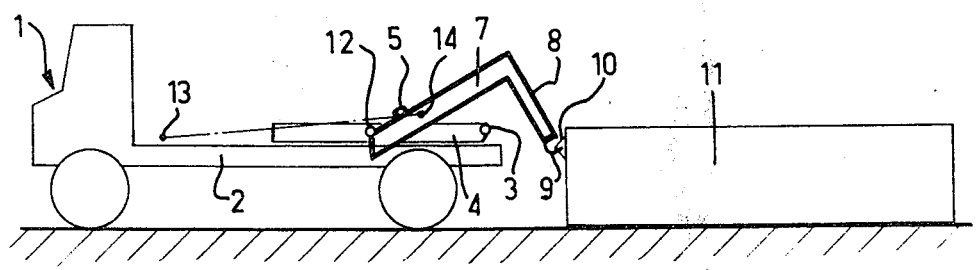

The upper part of side member 4 is provided with an opening or recess 17 of size such as to permit free passage therethrough of slipper 5, as follows. After the jack has operated in one direction and caused branch 7 to translate backwards in side member 4, being guided by slipper 5 (FIGS. 1 and 2), the outer end of branch 7 abuts against stop means 6, into which engages hinge pin 12 (FIG. 2). The continuing stroke of the jack then causes branch 7 to pivot about pin 12, the slipper 5 being no longer restrained in translation by the side member and being able to disengage through opening 17 (FIG. 3). The pivotal motion then continues responsively to the jack stroke until the dump-body is set down on the ground (FIG. 4). The above operations are performed in reverse order for loading the dump-body on the truck.

Referring now to FIGS. 6 to 9, the mechanism shown thereon includes the same component parts as those described hereinbefore, but the point of application 18 of the jack piston on branch 7 is obtained through an arrangement schematically illustrated at 19, 20 and 21 and constituting a parallel-motion linkage which is effective in amplifying the travel of application point 18 in relation to the actual travel of said piston. This amplified travel occurs mainly during the backward translation of branch 7, that is to say when the force required of the jack is less than during the pivoting phase. Application point 18 is located upon a link 19 hingedly connected to a fixed point 22 and to a point 23 on a second link 20 which is itself hingedly connected to branch 7 at 24, in such manner that the hinge points 22, 23, 24 form a triangle. In addition, a supporting member 21 interconnects hinge point 22 and the fixed point on the chassis that lies substantially on the tipping hinge-line.

Figure 9:
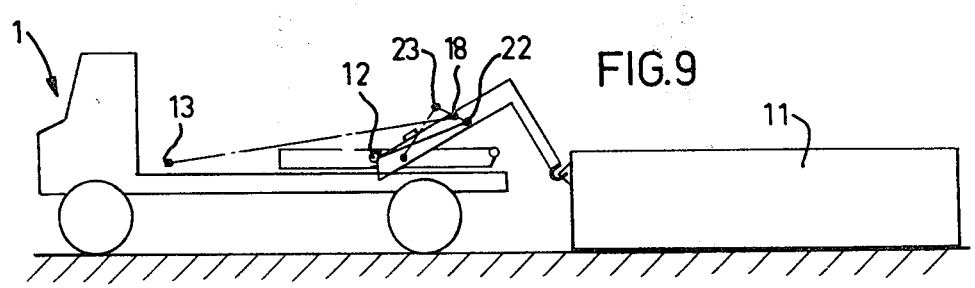

The phases of operation are identical to those illustrated in FIGS. 1 to 4, to wit, in respect of continuing jack travel, a resting position (FIG. 6), backward translation of the dump-body (FIG. 7), abutment of the branch 7, disengagement of the slipper 5 followed by tilting motion (FIG. 8), and setting of the dump-body on the ground (FIG. 9).

Figure 5:
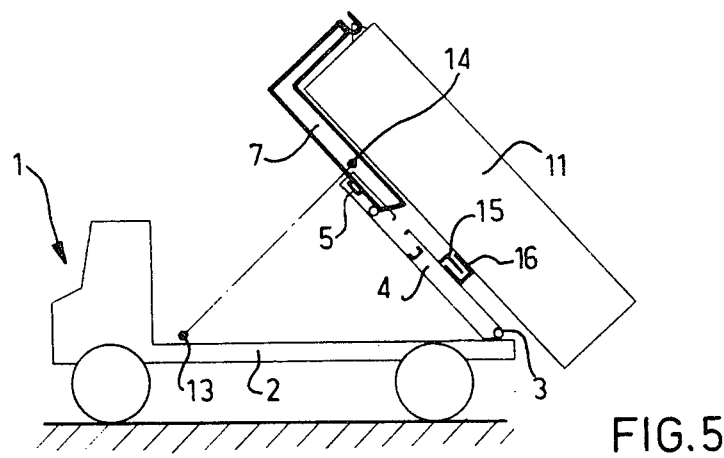
Figure 10:
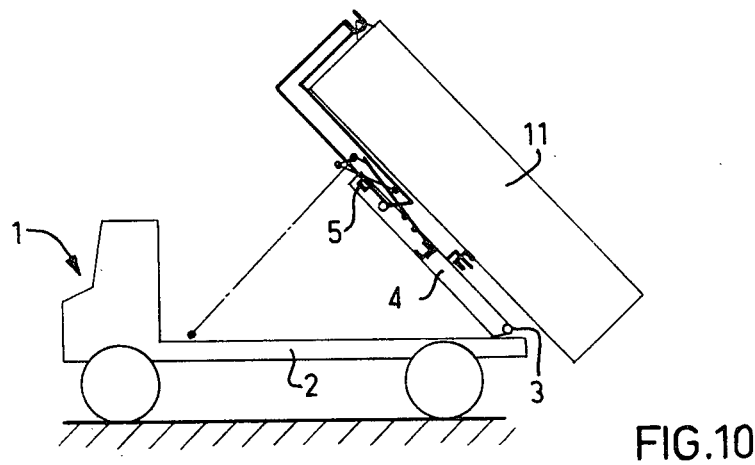
FIG. 10 illustrates operation of the mechanism according to FIGS. 6 to 9 in the dump-truck mode.

In the embodiment shown in FIGS. 5 and 10, the mechanism according to the invention permits operation in the dumping mode, in which case the slipper 5 remains locked in its forward position within side member 4, whereby the latter is able to tilt together with the dump-body about the rear hinge-line 3 responsively to the thrust of the jack.

Figure 11:
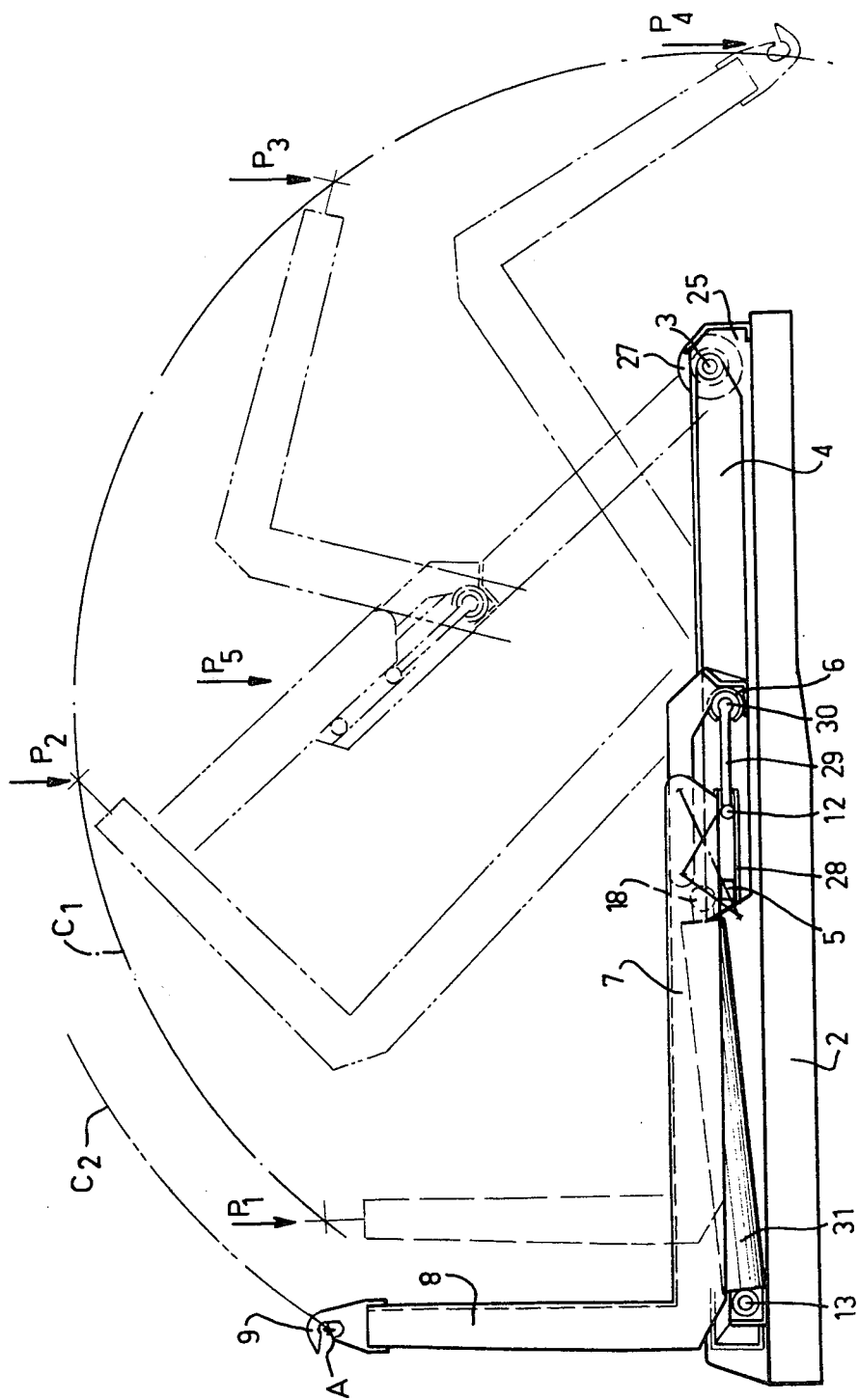
FIGS. 11 and 12 are respectively side elevation and plan views of a possible embodiment of a mechanism according to this invention, equipped with a schematically illustrated linkage arrangement.
Figure 12:
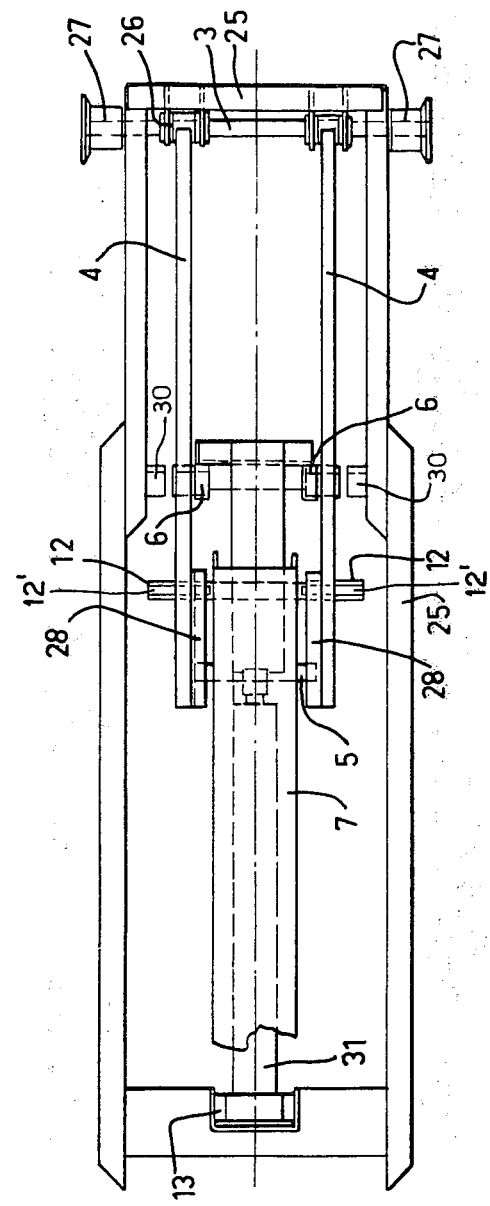

Reference is next had to FIGS. 11 and 12 for a possible embodiment in which the subject mechanism of the invention is carried on a sub-frame 25 the rear portion of which carries a hinge shaft 3 to which the two parallel side-members 4 are pivotally connected through the medium of suitable bearings 26. Shaft 3 projects from either side of sub-frame 25 and carries a roller 27 at each end for assisting the dump-body in its loading and unloading motions. Side members 4 each bear a slideway 28, possibly of the fitted type, into which engages the slipper 5 fast with the branch 7. The pivoting shaft 12 which is also fast with branch 7 engages into two grooves 29 formed in side members 4, and the rear ends of said grooves define an accommodation 30 for shaft 12 after translation thereof, which accommodation is limited by a stop 6.

An actuating jack 31 is connected across point 13 on the sub-frame and point 18 on a link which is part of a linkage system which will be described in greater detail hereinafter with reference to FIG. 13.

Reference is now had to FIG. 11 for a schematic representation of the kinematics of operation of the subject mechanism of this invention. In the resting position shown in solid lines, the L-shaped member 7–8 is in its forward position on the truck. In the process of setting the dump-body (not shown) on the ground, the initial actuating motion causes said L-shaped member to withdraw (position $P_1$), with slipper 5 translating through slideway 28 up to the limit position therein forming the opening 17. Upon reaching this position, shaft 12 engages into accommodation 30 and pivoting of the L-shaped member takes place as the jack continues to exert thrust (positions $P_2$–$P_3$) until the dump-body is set down on the ground (position $P_4$). If one considers the geometrical axis A of the hook 9, it will be seen that the pivotal motion causes a circular arc $C_1$ to be described about the centre of accommodation 30. This arc $C_1$ is consequently a minimal arc, but would be of greater radius if the pivotal motion were to be effected directly from the forward position of the L-shaped member (arc $C_2$).

Also shown on FIG. 11 in schematic dot-dash lines is the position of the component parts when the mechanism is operated for a straightforward dump-truck, with the dump-body tilting about the tilting shaft 3 (position $P_5$). As stated precedingly, the slipper 5 in this case remains locked in its forward position in slideway 28, so that pivotal motion cannot take place in the accommodation 30 and is accordingly effected about shaft 3.

Figure 13:
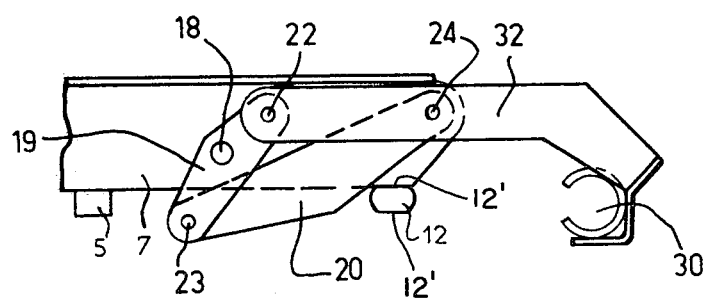
FIG. 13 is a detail view on an enlarged scale of the linkage arrangement included in the mechanism of FIG. 11.
Figure 6:
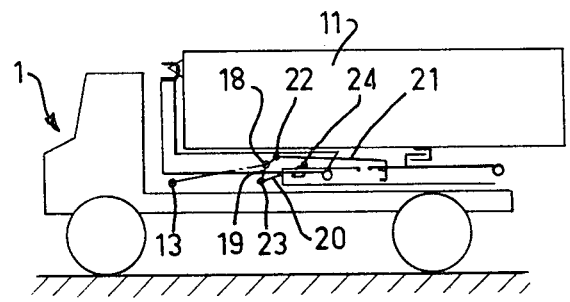
Figure 7:
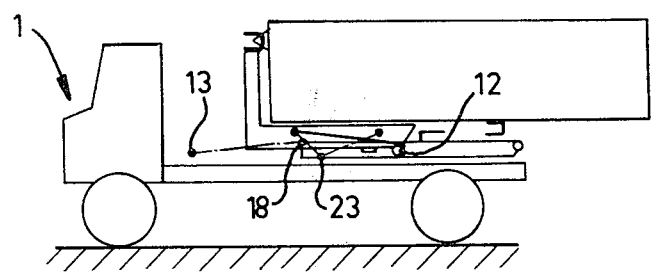
Figure 8:
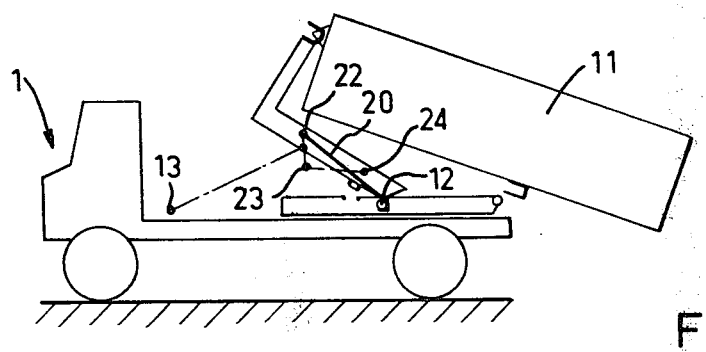

Referring lastly to FIG. 13, there is shown thereon a possible embodiment of a parallel-motion linkage system of the pantograph type, well-known per se. The links thereof may be hingedly connected to a support 32 which is fixed during translation but able to pivot about the accommodation 30 during pivotal motion. Hingedly connected to support 32 at 22 is a link 19 bearing the jack thrust point 18 and at 24 a link 20, these links 19 and 20 being mutually articulated at 23. Preferably, the ends of shaft 12 are each formed with two parallel flats 12' to assist translation through slideway 28 and permit locking of the axle in the accommodation 30 as soon as pivotal motion is initiated.

It goes without saying that changes and substitutions may be made in the exemplary preferred embodiment hereinbefore described without departing from the scope of the invention, as defined in the appended claims.

I claim:

1. In a vehicle comprising a dump-body with a fastening member carried on the front upper part of said dump-body and the stubs fixed to the underneath of said dump-body, a chassis with a fixed reaction point on the front of said chassis, a truck dump-body actuating mechanism mounted on said chassis and comprising in combination:

an L-shaped pivot member including a vertical branch with an outer upper end and a horizontal branch with an outer rear end, horizontally translatable between a forward position and a rearward position relative to said chassis, an automatic hook borne on the upper end of said vertical branch and cooperating with said fastening member, tilting means articulated about a tilting axis transverse to said chassis, fixed at the outer end of said horizontal branch, a slipper carried by said horizontal branch, the distance between said slipper and said tilting axis being fixed, a thrust point on the horizontal branch, two parallel side members comprising tilting means articulated about a tilting axis transverse to said chassis, fixed at the rear end of said two parallel side members at the rear end of said chassis to connect the said two parallel side members with said chassis, a space between said two parallel side members to constitute slipping means where said slipper is engaged for sliding translation, an opening at the upper part of said parallel side members and having a size at least equal to that of said slipper, stop means for limiting the sliding travel of said horizontal branch of said L-shaped pivot member toward the rearward position fixed at the said side members and in front of a correspondent part of said horizontal branch, the distance between said stop means and the opening being such that said slipper is in registry with said opening when said horizontal branch bears against said stop means to reach a pivoted position, projecting catch means upon the upper part of said side members to be in engaging relationship with said stubs fixed to the underneath of said dump-body to impart lateral stability to the latter in its loaded position.

and a single jack for controlling horizontal sliding and pivotal motion, connected between said fixed reaction point on the front of said chassis and said thrust point on said horizontal branch.

2. A truck dump body actuating mechanism as claimed in claim 1, in which said tilting means articulated about the tilting axis fixed at the outer end of said horizontal branch of said L-shaped pivot member comprise a transverse shaft, and said side members having holes to receive said transverse shaft, limited by said stop means, two parallel restraining flats being formed at the ends of said shaft to restrain said shaft in said side members upon initiation of the pivoting motion.

3. A truck dump body actuating mechanism as claimed in claim 1, in which said tilting means articulated about the tilting axis fixed at the outer end of said horizontal branch include a pivot, and said side members include a transverse shaft, said transverse shaft being articulated in said pivot immediately adjacent said stop means.

4. A truck dump body actuating mechanism as claimed in claim 1, in which said chassis comprises a fixed reaction point on the front of said chassis, and said horizontal branch and said side members comprise between them a parallel motion type linkage with a link forming part of said parallel motion type linkage, said link providing a thrust point, said actuating jack being connected between said fixed reaction point and said thrust point.

* * * * *